United States Patent [19]
Johnston

[11] 3,938,867
[45] Feb. 17, 1976

[54] THRUST WASHER

[75] Inventor: Dean E. Johnston, Thomaston, Conn.

[73] Assignee: The Torrington Company, Torrington, Conn.

[22] Filed: May 20, 1974

[21] Appl. No.: 471,282

[52] U.S. Cl. .............................................. 308/235
[51] Int. Cl.² ......................................... F16C 33/58
[58] Field of Search ........... 308/163, 165, 175, 216, 308/219, 235, 236; 113/117; 29/148.4 R, 148.4 C

[56] References Cited
UNITED STATES PATENTS

| | | | |
|---|---|---|---|
| 624,047 | 5/1899 | Keiper | 113/117 |
| 1,958,025 | 5/1934 | Styri | 29/148.4 C UX |
| 2,891,828 | 6/1959 | Winchell | 308/235 |
| 2,997,349 | 8/1961 | Pitner | 308/235 |
| 3,080,731 | 3/1963 | Atkinson | 308/236 X |
| 3,224,242 | 12/1965 | Noll | 29/148.4 C |
| 3,713,713 | 1/1973 | Alling et al. | 308/235 |

Primary Examiner—Robert J. Spar
Assistant Examiner—Randolph A. Reese
Attorney, Agent, or Firm—Frank S. Troidl

[57] ABSTRACT

The new thrust washer includes an inner flange with circumferentially spaced cutouts. The washer is formed from flat strip steel. A circular hole and a plurality of cutouts extending from the circumference of the circular hole are made in the flat strip steel. The circular hole and cutouts may be made consecutively or simultaneously. A forming tool forms the inner flange.

4 Claims, 7 Drawing Figures

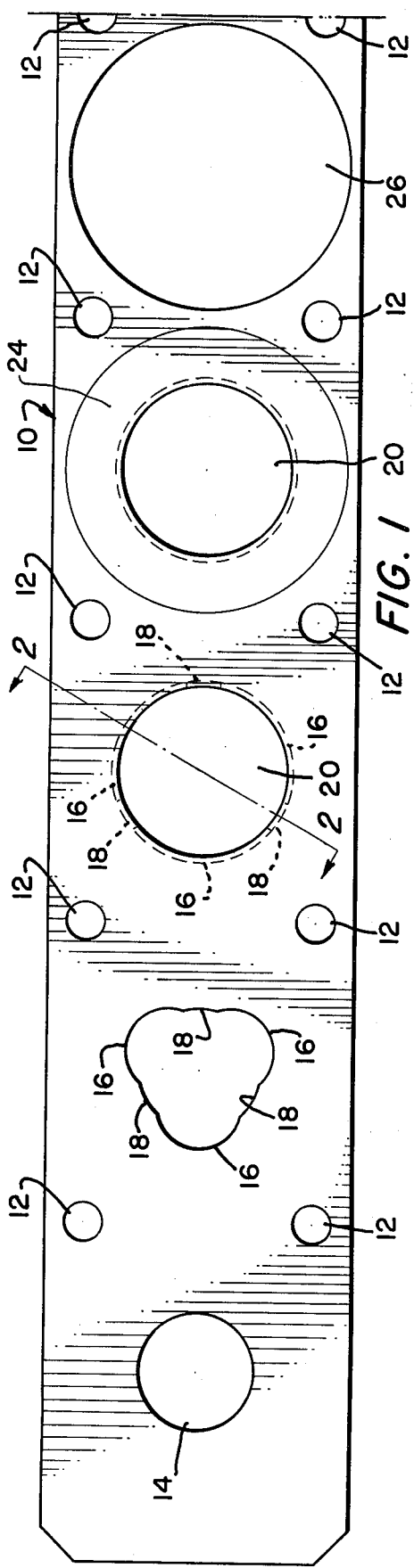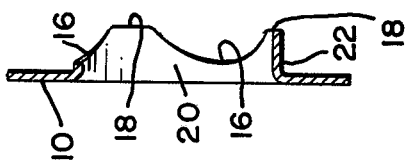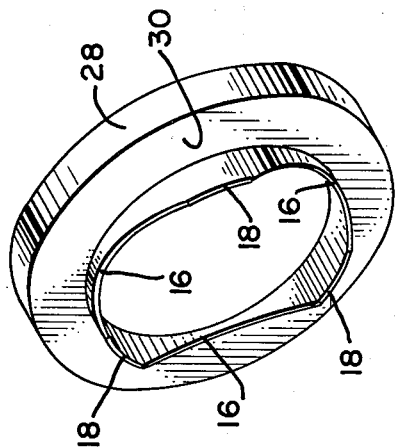

THRUST WASHER

This invention relates to thrust bearings. More particularly, this invention is a new and novel thrust washer.

With current methods of forming thrust washers having axially extending inner and outer flanges, it is highly important that during the formation of these flanges, cracks do not form in the flanges due to the stressing of certain areas of the flange. The high carbon steel used in thrust washers work-hardens readily. The piercing of the center hole in the washer results in work-hardened material near the sheared edges. Thus, as the punch forms the inner flange, the free end of the flange is highly stressed as it is stretched. Cracks occur extremely often giving an unacceptable product.

In some current methods of forming thrust washers, it is attempted to eliminate the cracks by annealing the washers in an annealing furnace after the hole has been pierced in the flat strip steel, the washer has been blanked out, and before the inner flange is formed. The annealing of the thrust washers has somewhat eliminated the edge cracking, but there is still some cracking at the points where the flange extends from the washer because frictional drag on the punch as the flange is formed stresses the material so highly.

Thus, with current methods of producing thrust washers from flat stripped steel, the steel is: (1) pierced to form a circular hole; (2) blanked out in an annular form; (3) annealed in an annealing furnace; (4) the flanges formed, and (5) the other manufacturing steps completed.

The annealing steps are time consuming. The annular blanks must be removed from the flat stripped steel. The annealing step and the flange forming steps each require a great deal of time. Also, even though the cracks on the edges of the resulting flanges are substantially eliminated, cracks still sometimes occur where the flange extends from the annular portions.

The advantage of a method which requires no annealing step, results in a thrust washer with no edge cracks on the flange, and no cracks where the flange is connected to the annular portion, is obvious.

My new method of forming a thrust washer with an inner flange has all of these advantages. The annealing step and two material-handling steps are eliminated; and the resulting new thrust washer has no cracks at any place on the flange, including the edge portion and the portion connected to the thrust washer.

Briefly described, my new method of forming a thrust washer from flat stripped steel comprises forming a circular hole in the flat strip steel and forming a plurality of cutouts extending from the circumference of the circular hole. The cutouts may be equally spaced or unequally spaced; and equally sized or unequally sized to suit each particular requirement. The circular hole and cutouts may be formed simultaneously or consecutively. An inner flange forming tool having a radius at least as large as the furthest radial extent of the cutouts is pressed against the metal around the circular hole and the cutouts to form the inner flange.

The new thrust washer formed by my method comprises an annular washer with a flange extending axially from the inner periphery of the annular washer. The flange has a plurality of cutouts extending around the circumference.

The invention, as well as its many advantages, may be further understood by reference to the following detailed description and drawings in which:

FIG. 1 is a plan view illustrating my new method;

FIG. 2 is a view taken along lines 2—2 of FIG. 1;

FIG. 3 is a perspective view of the new thrust washer formed by the method illustrated in FIG. 1;

FIG. 4 is a fragmentary plan view showing an alternative method;

In the various figures, like numbers refer to like parts.

Figure 5:
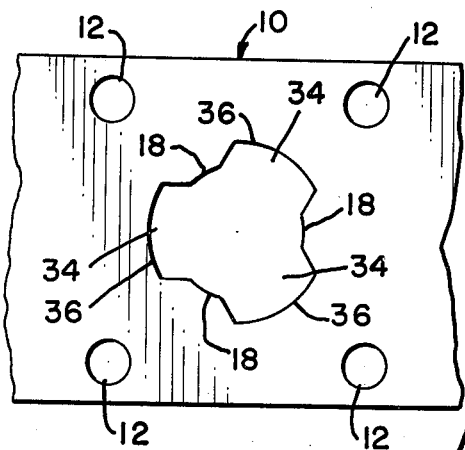
FIG. 5 is a fragmentary plan view showing another alternative method.

Referring to FIG. 1, the new thrust washer is formed from a long sheet 10 of flat strip steel. Piloting pins (not shown) extend into the holes 12 so the flat strip may be moved longitudinally through the various stations used for forming the thrust washer.

In the method illustrated by FIG. 1, a progressive die is used. A circular hole 14 is first punched through the flat strip steel 10. For purposes of illustration, only one hole 14 is shown. However, in actual practice, a plurality of holes 14 will be made at a particular station of the manufacturing process.

After the hole 14 is formed in the flat strip steel 10, a plurality of spaced cutouts 16 is formed. The cutouts 16 extend from the circumference 18 of the previously formed hole 14. The cutouts 16 are in the shape of circular sectors. The circular hole 14 and cutouts 16 may be made simultaneously as well as consecutively.

The flat strip steel 10 is then fed to the next station where an inner flange forming tool (not shown) is pressed against the flat strip steel to form bore 20 and inner flange 22 of the thrust washer (see FIG. 1 and FIG. 2). The flange forming tool has a radius at least as large as the furthest radial extent of the cutouts 16.

At a next stage in the method, annular blank 24 is blanked out. If there is to be an outer flange, this flange would be formed at the next station (not shown). If there is to be no outer flange, the washer is ejected leaving hole 26.

As with the hole 14, for purposes of illustration only, one cutout portion area, one hole 20, one annular blank 24, and one hole 26 are shown in FIG. 1. However, in actual practice probably several of each of these will be made simultaneously. There is no annealing. Therefore, there is no need to remove the material from the flat strip steel 10 before the inner flange is formed. Because the free end of the flange is provided with cutouts, the stress level is low enough that cracking does not occur at the free end of the flange. Also, because the stress is low enough, the frictional drag on the flange forming punch is much lower. Cracking seldom occurs at the point where the flange extends from the plate 10. In addition, punch life is greater.

FIG. 3 shows a completed race with an outer flange as well as an inner flange. The outer flange 28 may be formed by bending the outside portion of the annular blank resulting in a washer having a radially extending annular portion 30, an outer flange 28 extending axially from the outer periphery of the radially extending annular portion, and inner flange 22 with the circumferentially spaced cutouts 16. Preferably, the cutouts do not extend the full length of the flange. The material extending axially from the radially extending annular portion 30 provides rigidity and strength to the part.

In FIG. 4, instead of circular sectors, oval sectors 32 extend from the circumference 18 of the hole and in FIG. 5, the cutouts are in the shape of rectangular sectors 34 with rounded outer edges 36. For certain purposes, the oval or rounded rectangular cutouts will work better for particular washers.

In each embodiment, unequally spaced cutouts are sometimes used. Unequally sized cutouts are also sometimes used.

Figure 6:
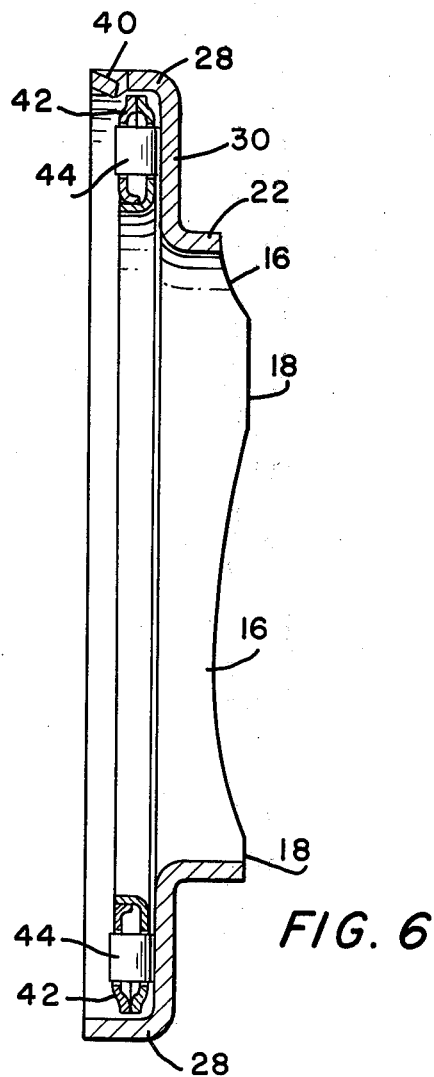
FIG. 6 is an elevational view, partly in section, illustrating my new thrust washer used as part of a single washer thrust bearing.

An example of the use of my new thrust washer in a bearing having one race is shown in FIG. 6. A plurality of tabs 40 have been formed adjacent the outer edge of the flange 28. Preferably there are three tabs circumferentially spaced apart on flange 28. Only one of these tabs is shown in the figure. The tabs serve to keep the cage 42 and rollers 44 within the thrust washer.

Figure 7:
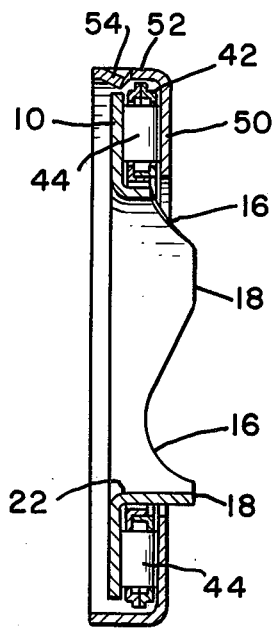
FIG. 7 is an elevational view, partly in section, illustrating my new thrust washer used as part of a two washer thrust bearing.

An example of the use of my new thrust washer in a bearing having two races is shown in FIG. 7. Added to the new thrust washer shown in FIG. 2 is a second thrust washer having a radially extending annular portion 50 and also having an outer flange 52. As with FIG. 6, a plurality of tabs 54 (only on tab being shown) are formed adjacent the outer edge of flange 52.

Though the new thrust washer is shown with tabs in FIG. 6 and FIG. 7, any other appropriate means can be used to keep the cage and rollers in the thrust washer, such as a full annular radially extending flange in place of the tabs 40.

If we have two thrust washers with inner flanges of the same bore size, but different lengths, the washer with the longer flange must have the center hole pierced to a smaller diameter than the center hole of the washer which has the shorter flange. The reason for this is that all the material which goes into the flange comes from the metal around the hole. Thus if you need a longer flange, you need to start with more material in the washer.

The material around this smaller hole has to be pushed out and stretched out much further than the material around the larger hole. This is what causes the higher stress level in the material when forming longer flanges. This is one reason why my new thrust washer is a great improvement in that I can form a relatively longer flange with a comparatively low stress level. Therefore, there is a great reduction in stress and a reduced tendency for the metal to crack.

I claim:

1. A thrust washer comprising: a radially extending annular portion and a flange extending axially from the inner periphery of the radially extending annular portion, said annular portion and flange being made of flat strip steel, said flange having circumferentially spaced cutouts extending around the circumference of the flange; the circumferential lengths of the cutouts at the free end of the flange forming the major part of the total circumference of the flange at such free end with at least a portion of each cutout having a curved surface, the axial lengths of the cutouts being less than the full length of the flange to provide rigidity and strength.

2. The thrust washer of claim 1 wherein the cutouts are circular sectors.

3. The thrust washer of claim 1 wherein the cutouts are oval sectors.

4. The thrust washer of claim 1 wherein the cutouts are rectangular sectors with curved surfaces.

\* \* \* \* \*